: 3,377,325
PROCESS OF COPOLYMERIZING OLEFINS UTILIZING VANADIUM OXYTRICHLORIDE, ALKYL ALUMINUM SESQUIHALIDE AND SULFUR AS THE CATALYST
Frederick C. Loveless, Oakland, N.J., assignor to Uniroyal, Inc., a corporation of New Jersey
No Drawing. Filed Aug. 26, 1963, Ser. No. 304,647
3 Claims. (Cl. 260—80.78)

ABSTRACT OF THE DISCLOSURE

Ethylene and propylene are copolymerized in solution in an organic solvent by a catalyst formed by the interaction of vanadium oxytrichloride and alkylaluminum sesquihalide. The activity or efficiency of the catalyst is greatly enhanced by adding a small amount of sulfur to the solution of monomers containing the catalyst. The method is useful for terpolymerizing ethylene and propylene with dienes, such as dicyclopentadiene.

---

This invention relates to improved catalysts for the polymerization of olefins, and methods for the polymerization of olefins using these improved catalysts. More particularly the invention comprises catalysts obtained by the interaction of (1) a vanadium salt,
(2) an organometallic compound of the type represented by the formulae
    (a) RMgX (Grignard reagent), where R is a hydrocarbon radical having for example from 1 to 12 carbon atoms for example an alkyl radical such as methyl, ethyl, etc. or an aryl radical such as phenyl, naphthyl, etc., and X is a halogen atom,
    (b) $LiAlR_4$, where R is as previously defined,
    (c) $R_AAlX_B$, where R and X are as previously defined, A is a number from 1 to 3, B is a number from zero to 2, and $A+B=3$, and
(3), as an activator, sulfur.

In the following, components 1 and 2—i.e., the vanadium salt and the Grignard reagent or the organoaluminum compound, or their interaction product—will frequently be referred to as the primary catalyst system, and component 3 will be referred to as the activator.

Polymerization catalysts which are the interaction products of (1) a compound of a metal of groups IV–B and V–B of the periodic table of the elements (see "Handbook of Chemistry and Physics," 41st ed., pps. 448–9, published by Chemical Rubber Publishing Company, Cleveland, Ohio) and (2) an organometallic compound of a metal of Group III–A of the periodic table are well known through patents and other publications of recent years. Some of these disclosures, such as Schreyer U.S. Patent 2,962,451, and Ziegler Belgian Patent 553,655, show catalysts falling within the scope of the primary catalyst systems of the present invention. Schreyer shows, among others, catalysts comprising a vanadium salt and an alkylaluminum halide, for the polymerization of ethylene or propylene. Ziegler shows catalysts from $VOCl_3$-trialkylaluminum for the copolymerization of ethylene with higher alpha-olefins. Sometimes the catalysts are insoluble or heterogeneous, and sometimes they are soluble, depending on the exact composition. These catalyst systems, and indeed all other prior art catalysts of this type known to the present inventor, are deficient in that they show a low catalyst efficiency (measured as weight of polymer produced per unit weight of vanadium compound per unit time); the polymerization rate is undesirably slow unless relatively high concentrations of catalyst are used; and, in the case of soluble catalyst, the activity decreases, often rapidly, during the course of the polymerization. These deficiencies are more serious in the copolymerization of ethylene with propylene or with other olefins having more than two carbon atoms, than in the homopolymerization of ethylene.

In British Patent 886,368, United States Rubber Company, published Jan. 3, 1962, improved catalyst systems using $VCl_4$ or $VOCl_3$ with either dialkylaluminum halide or alkylaluminum dihalide, or mixtures of the two, are disclosed which show a catalyst efficiency in the copolymerization of ethylene and propylene 10–100 times as great as that of the aforementioned prior art catalysts. Even the improved catalysts of British Patent 886,368 are amenable to substantial further improvement by addition of the activators of the present invention, especially as regards the maintenance of catalytic activity over a relatively long period of polymerization.

The present invention contemplates the activation of a primary catalyst system of the kind described, by means of sulfur.

The olefins which are polymerized by the present process include ethylene, propylene and similar alphaolefins having the formula $CH_2=CHR$ in which R is hydrogen or a hydrocarbon radical, particularly a saturated alkyl hydrocarbon radical having from 1 to 8 carbon atoms (including, e.g., butene - 1; hexene-1; 4-methylpentene-1; 5-methylhexene-1; 4-ethylhexene-1).

A preferred form of the invention is directed to the copolymerization of ethylene and propylene to yield rubbery products, and an especially preferred practice of the invention contemplates the production of unsaturated, sulfur-vulcanizable, rubbery terpolymers of ethylene and propylene and a diene such as dicyclopentadiene, methylcyclopentadiene dimer, 1,4 - hexadiene, 11-ethyl-1,11-tridecadiene, 1,9-octadecadiene, 1,5-cyclooctadiene, or other suitable copolymerizable dienes such as are disclosed in British Patent 880,904 of Dunlop Rubber Co., Oct. 25, 1961, U.S. Patents 2,933,480, Gresham and Hunt, Apr. 19, 1960, and 3,000,866, Tarney, Sept. 19, 1961, and Belgian Patents 623,698 and 623,741 of Montecatini, Feb. 14, 1963, the disclosures of which are hereby incorporated herein by reference. Preferred terpolymers contain from about 1 to about 25% (more preferably about 2 to about 15%) by weight of dicyclopentadiene or the like; the remaining portion of the interpolymer frequently contains from about 30% to about 80% and preferably from about 40% to about 70% by weight of propylene, the remainder being ethylene.

Considering in more detail the primary catalyst system which is activated in accordance with the method of the invention, such primary catalyst system comprises, as indicated previously (1) a vanadium salt, and (2) a Grignard reagent or an organoaluminum compound. Among the vanadium salts which may be used there may be mentioned vanadium halides, oxyhalides, alkoxides and acetylacetonates. Specific examples of these salts are vanadium dichloride, vanadium trichloride or vanadium tetrachloride or tetrabromide, vanadium oxydichloride, vanadium oxytrichloride, alkyl vanadates (especially where the alkyl group contains 1–12 carbon atoms, e.g., n-butyl vanadate), vanadyl or vanadium acetylacetonate, and the like, as well as salts based on mixtures of more than one of the foregoing types, such as dialkyl halovanadates (e.g., dibutyl chlorovanadate) and alkyl dihalovanadates (e.g. butyl dichlorovanadate). In many cases preferred vanadium compounds are vanadium oxytrichloride, vanadyl or vanadium acetylacetonates, lower alkyl vanadates (alkyl groups of 1–4 carbon atoms) and halovanadates, especially chlorovanadates(mono- and dichloro). Such a vanadium compound (1) is combined with an organometallic compound (2) to give the primary catalyst system. Unfortuately such a conventional primary catalyst system, as indicated above, is frequently not as effective as would be desired, and may soon become inefficient or inactive. The present invention is based on my surprising discovery that the primary catalyst system is made more effective, maintains its activity for a longer period, or can be reactivated after it beings to slow down, if sulfur is added as an activator. While I do not desire to limit the invention to any particular theory of operation, it appears possible that the ability of the sulphur to activate the primary catalyst is a consequence of an oxidizing action whereby the sulfur transforms at least a part of the vanadium into a valence state of 3 or more. Although the effect is not entirely understood, it appears as though the primary catalyst, as initially produced by the reaction of the vanadium compound and the organometallic compound is originally or may soon become inactive, because of the absence of vanadium in a valence state greater than $+2$ but transformation of some of the vanadium to a higher valence state by the sulfur reactivates the catalyst. Whatever the explanation, it is indeed surprising that the sulfur has the presently described beneficial effect on the primary catalyst. The benefits of the use of such activator in accordance with the invention are especially important in making ethylene-propylene or ethylene-propylene-diene interpolymer, since such interpolymerization is in general much more difficult to effect efficiently than the simple homopolymerization of ethylene, for example.

It will be understood that in place of mixing the vanadium compound with an organo-aluminum compound directly to form the primary catalyst system, I may produce an equivalent system indirectly by the method of Carrick (J. Am. Chem. Soc. 82, 3883 (1960)), involving mixing, for example, tetraphenyltin, aluminum halide, and vanadium oxytrichloride, whereby phenylaluminum halide is believed to be formed in situ. Such a mixture may be activated in accordance with the present invention.

The preferred primary catalyst system for use in the present invention is the soluble (i.e., soluble in organic hydrocarbon solvents, including the monomers to be polymerized) catalyst formed by interaction of vanadium oxytrichloride and an alkylaluminum halide, in which category I include mixtures of alkylaluminum halides, such as may be formed by admixing dialkylaluminum monohalide with monoalkylaluminum dihalide, or even by mixing trialkylaluminum with aluminum trihalide. In such preferred soluble primary catalyst system, the molar ratio of aluminum to vanadium is at least 5:1, and preferably at least 10:1; higher ratios such as 20:1, 35:1, 50:1, or even higher, may also be used. These preferred soluble primary catalyst systems are remarkable for their ability to form an amorphous rubbery ethylene-propylene interpolymer, and particularly for their ability to form an amorphous ethylene-propylene-diene interpolymer that is sulfur-vulcanizable to yield a high quality rubber stock. In preferred $R_AAlX_B$ compounds R is a lower alkyl (1 to 4 carbon atoms) and X is chlorine.

If desired even higher ratios of aluminum to vanadium (e.g. 200:1 or higher) may be employed, especially in those cases where the concentration of vanadium compound used is very small.

It will be understood that the type formula $R_AAlX_B$ used to describe the typical organo-aluminum compounds is simply an empirical formula intended to include any of a wide variety of compounds or mixtures of compounds that might result for example from bringing together trialkylaluminum compounds, aluminum trihalides and/or alkylaluminum halides. For example, equimolar mixtures of monoalkylaluminum dihalide and dialkylaluminum monohalide, or equimolar mixtures of trialkylaluminum and aluminum trihalide, may be regarded as producing the alkylaluminum sesquihalide ($R_3Al_2X_3$, which may be written empirically as $R_{1 1/2}AlX_{1 1/2}$). A mixture of trialkylaluminum and dialkylaluminum monochloride may be regarded as providing a material of the type $R_5Al_2Cl$ or empirical formula $R_{2 1/2}AlCl_{1/2}$. It should be noted that the type formula $R_AAlX_B$ as defined permits the use of trialkylaluminum as such, but not aluminum trihalide as such.

Particularly useful organo-aluminum compounds are the alkylaluminum compounds, in which category I include alkylaluminum halides.

Although the soluble catalyst compositions have been described as preferred, especially in the interpolymerization of ethylene and propylene, it will be understood that in other cases, notably the homopolymerization of propylene, the insoluble or heterogeneous type of catalyst is used.

The amount of sulfur employed as activator for the primary catalyst system in accordance with the invention is in general not especially critical. Surprisingly small amounts of activator, e.g. about 0.1 mole of sulfur per mole of vanadium compound, may be sufficient in many cases to produce a noticeable activating effect. Usually it is preferred to use somewhat larger amounts, typically about 1 or 2 moles of activator per mole of vanadium, but it will be understood that considerably more activator than this may be employed if desired. Ordinarily there is little or no proportionate added advantage, as far as activating effect is concerned, in using appreciably more than about 3–5 moles of sulfur, and for reasons of economy I generally do not use more than this amount. Thus, amounts of activator as high as about 10 moles or even more can be employed, but ordinarily any larger amounts would be avoided as unnecessary. In any case, the molar amount of sulfur of course does not exceed the molar amount of organo-metallic compound.

The optimum amount of activator in any given case will depend upon the specific composition of the primary catalyst, as well as such variables as the exact polymerization procedure. The activator may all be introduced at the start, or preferably it may be introduced continuously or in increments as the polymerization proceeds. The activator in some cases may be combined with either of the primary catalyst ingredients immediately before introduction into the monomers to be polymerized, or after introduction of at least a portion of the monomers, but I prefer to mix the primary catalyst ingredients before adding the activator. I prefer to combine the primary catalyst ingredients in the presence of at least a portion of the monomers, since the best yields are obtained in this way. If the primary catalyst system is mixed in the presence of the monomers, the activity of the catalyst is often very satisfactory at the start, but falls off rapidly as the polymerization progresses. In such cases, the activator is added at such times and in such amounts as to prevent the decrease in catalyst activity. The time of the additions and the amount of activator employed in each addition will vary over a wide range depending on the other variables in the system, as noted above.

Another procedure involves first combining the primary catalyst ingredients in the absence of monomers, and subsequently, after combining the primary catalyst with the monomers, adding the activator.

The process is conveniently carried out in a solvent although an added solvent is not essential; the monomers being polymerized can serve as the solvent. In general, the normal solvents for Ziegler-type coordination polymerization can be used. These include the aromatic hydrocarbons, aliphatic hydrocarbons, chlorobenzene, tetrachloroethylene, and any other solvents which will not destroy the catalyst. Furthermore, the procedure may otherwise be the same as in conventional practice as far as such details as temperature of polymerization, pressure, concentration of catalyst, and the like, are concerned.

One preferred practice of the invention contemplates continuously (1) interpolymerizing ethylene, propylene and a diene such as dicyclopentadiene, for example, by introducing the mixture of monomers into a first polymerization zone wherein it is combined with at least a portion of each of the catalyst ingredients and (2) withdrawing a stream containing at least a portion of terpolymer from said zone, and (3) repeating steps (1) and (2) in one or more subsequent polymerization zones, into which the reaction stream withdrawn from the previous polymerization zone is introduced successively. The activator of the invention is preferably introduced in the second polymerization zone. There may be introduced incrementally or continuously into each zone more of the primary catalyst ingredients, particularly the vanadium compound and/or more activator, as required, to maintain the system at peak efficiency consistent with economical utilization of catalyst. More of one or more of the monomers may be introduced in such subsequent reaction zones, if desired. The stream issuing from the final reaction zone, in the form of a thick solution usually called a cement, may be processed in the usual way to separate the polymer and remove catalyst residues.

Schreyer, in U.S. Patent 2,962,451, teaches catalysts made by mixing a vanadium compound in which the vanadium is in a higher state of valence, that is, +3 or higher, with an organometallic compound in amount sufficient to reduce the vanadium at least in part to a valence state of less than +3. While such a catalyst may be activated in accordance with the present invention it is desired to point out that it is not essential for purposes of the invention that the vanadium compound employed have a valence of at least +3. On the contrary, vanadium compounds in which the vanadium has a valence of less than +3, such as vanadium dichloride, may be used. However, it will be understood that in that case the product obtained by mixing the vanadium compound with the organometallic compound is not an active catalyst until the activating substance of the invention is added. This is in contrast to the product obtained by mixing a vanadium +3 compound with the organometallic compound, which product is an active catalyst even before the activator is added. Although vanadium compounds in which the vanadium has a valence of less than +3 may be used in the invention, it is preferred to use vanadium compounds in which the vanadium has a valence of at least +3; such compounds are particularly advantageous from the standpoint of the described continuous polymerization procedure in which the catalyst is introduced into a first polymerization zone without activator, and the activator is added subsequently after a certain amount of polymerization has taken place.

The following examples will serve to illustrate the practice of the invention in more detail.

Example 1

In a two-liter flask equipped with condenser, stirrer, thermometer and a tube for subsurface feeding of gaseous monomers, 700 cc. of purified benzene was saturated at atmospheric pressure by an equimolar feed of high purity ethylene and propylene, using a total feed of 4 liters per minute. One millimole of sulfur (.032 g.) was dissolved in the benzene during the saturation period. Then 16 ml. of a benzene solution of 1.0 millimole of $Et_3Al_2Cl_3$ and 0.1 millimole of $VOCl_3$ was added to the reaction flask. The temperature started to rise slowly and continued to climb for about 10 minutes. Essentially no drop in temperature occurred for the next 10 minutes. At the end of 30 minutes, 15 cc. of isopropanol was added to destroy active catalyst. The solution was then treated with 10 cc. of a 5% solution of antioxidant, 2,2'-methylene-bis (4-methyl-6-t-butylphenol), in toluene, and the polymer was flocculated in methanol. After being chopped in a Waring blendor the polymer was vacuum-dried at 40° C.; yield, 10.4 g. The efficiency (g. of polymer per g. of $VOCl_3$) was 600. No crystallinity could be detected by X-ray. The weight ratio of propylene to ethylene in the polymer was 45/55, and the intrinsic viscosity (at 135° in tetralin) was 2.40.

In a similar manner, the activation method of the invention may be applied to catalyst systems produced from other vanadium compounds such as vanadium dichloride, vanadium trichloride, vanadium tetrabromide, vanadium tetrachloride, butyl vanadate or other alkyl vanadate, vanadyl acetylacetonate, vanadium acetylacetonate, dibutyl chlorovanadate, butyl dichlorovanadate, and the like.

Similarly, other alkylaluminum halides such as diethylaluminum chloride or ethylaluminum dichloride may be substituted in the foregoing examples. In place of using alkylaluminum halides or trialkylaluminum as the organometallic component of the primary catalyst system in practicing the invention, there may be employed Grignard reagents, represented by phenylmagnesium bromide, ethylmagnesium chloride, and the like, or lithium aluminum tetraalkyls, such as lithium aluminum tetraethyl, and the like. Similarly, the system of Carrick (tetraphenyltinaluminum halide-vanadium compound) may be used as a means of providing in situ a combination of organoaluminum halide and vanadium compound for activation in accordance with the method of the invention. Homopolymers of ethylene or propylene may be prepared.

Example 2

Example 1 may be repeated, except that the feed may include 1.5 milliliters of dicyclopentadiene. Unsaturated, sulfur-vulcanizable, rubbery terpolymer of ethylene-propylene-dicyclopentadiene is obtainable in good yield, having an iodine number of 11.5.

Having thus described my invention, what I claim and desire to protect by Letters Patent is:

1. In a method of copolymerizing ethylene and propylene wherein
   (A) the said monomers are dissolved in an organic hydrocarbon solvent, and
   (B) contacted therein with a catalyst dissolved in said solvent formed by the interaction of
      (i) vanadium oxytrichloride with
      (ii) an alkylaluminum sesquihalide,
   the mole ratio of aluminum to vanadium being from 10:1 to 200:1, the improvement comprising:
   (C) contacting the solution of monomers and catalyst with
      (iii) sulfur in amount of from 0.1 to 10 moles per mole of vanadium,
   whereby the activity of the catalyst is enhanced, the sulfur being mixed with the catalyst in the presence of the said monomers.

2. A method as in claim 1 in which a copolymerizable diene is copolymerized with said ethylene and propylene to form an amorphous sulfur-vulcanizable rubber.

3. A method as in claim 2 in which the said diene is dicyclopentadiene.

References Cited

UNITED STATES PATENTS

| | | | |
|---|---|---|---|
| 3,147,239 | 9/1964 | Canterino et al. | 260—94.9 |
| 3,211,709 | 10/1965 | Adamek et al. | 260—80.5 |

JAMES A. SEIDLECK, *Primary Examiner.*

J. L. SCHOFER, *Examiner.*

J. A. SEIDLECK, W. HOOVER, *Assistant Examiners.*